United States Patent
Usami (10) Patent No.: US 11,930,272 B2
(45) Date of Patent: Mar. 12, 2024

(54) CAMERA AND METHOD FOR CONTROLLING CAMERA

(71) Applicant: Hitachi Kokusai Electric Inc., Tokyo (JP)

(72) Inventor: Hirotake Usami, Tokyo (JP)

(73) Assignee: Hitachi Kokusai Electric Inc., Tokyo (JP)

(*) Notice: Subject to any disclaimer, the term of this patent is extended or adjusted under 35 U.S.C. 154(b) by 231 days.

(21) Appl. No.: 17/642,563

(22) PCT Filed: Sep. 24, 2019

(86) PCT No.: PCT/JP2019/037242
§ 371 (c)(1),
(2) Date: Mar. 11, 2022

(87) PCT Pub. No.: WO2021/059326
PCT Pub. Date: Apr. 1, 2021

(65) Prior Publication Data
US 2022/0329728 A1 Oct. 13, 2022

(51) Int. Cl.
*H04N 23/60* (2023.01)
*G06T 5/00* (2006.01)
(Continued)

(52) U.S. Cl.
CPC .......... *H04N 23/665* (2023.01); *G06T 5/002* (2013.01); *H04N 7/0127* (2013.01); *H04N 23/81* (2023.01);
(Continued)

(58) Field of Classification Search
None
See application file for complete search history.

(56) References Cited

U.S. PATENT DOCUMENTS

2005/0012827 A1 1/2005 Nakasuji et al.
2005/0162529 A1 7/2005 Nakasuji et al.
(Continued)

FOREIGN PATENT DOCUMENTS

EP 1469673 A1 10/2004
JP 2008-042838 A 2/2008
(Continued)

OTHER PUBLICATIONS

International Search Report dated Nov. 12, 2019, issued in counterpart International Application No. PCT/JP2019/037242, 1 pg.

*Primary Examiner* — Paul M Berardesca
(74) *Attorney, Agent, or Firm* — Procopio, Cory, Hargreaves & Savitch LLP (57) ABSTRACT

The invention performs a processing for improving an image quality of a camera in a state where a sufficient link rate cannot be ensured. A controlling method for a camera includes an imaging sensor configured to acquire an imaging data, a signal processing unit configured to perform an image processing on the imaging data, a buffer into which data subjected to the image processing is written, and a format conversion unit configured to convert a format of data read from the buffer and transmit the data to a transmission path, wherein the controlling method includes a status prediction step of predicting a status of the buffer based on a readout rate of the imaging sensor and a link rate of the transmission path and generating a status prediction information, and an adjustment step of adjusting a content of the image processing according to the status prediction information.

12 Claims, 5 Drawing Sheets

(51) Int. Cl.
*H04N 7/01* (2006.01)
*H04N 23/81* (2023.01)
*H04N 25/443* (2023.01)

(52) U.S. Cl.
CPC . *H04N 25/443* (2023.01); *G06T 2207/10016* (2013.01); *G06T 2207/10021* (2013.01); *G06T 2207/20008* (2013.01)

(56) References Cited

U.S. PATENT DOCUMENTS

| | | |
|---|---|---|
| 2014/0333801 A1 | 11/2014 | Nakasuji et al. |
| 2014/0362270 A1* | 12/2014 | Hu ................... H04N 25/771 348/308 |
| 2017/0332027 A1* | 11/2017 | Furumochi ............ H04N 25/75 |
| 2019/0231293 A1* | 8/2019 | Omi .................... A61B 6/5282 |
| 2021/0185272 A1* | 6/2021 | Sakurabu ............... H04N 25/79 |
| 2021/0368072 A1* | 11/2021 | Kawai .................... H04N 5/772 |

FOREIGN PATENT DOCUMENTS

| | | |
|---|---|---|
| JP | 2008-118698 A | 5/2008 |
| KR | 10-2014-0132141 A | 11/2014 |

* cited by examiner

CAMERA AND METHOD FOR CONTROLLING CAMERA

CROSS-REFERENCE TO RELATED APPLICATIONS

This application is a U.S. National Stage entry of PCT Application No: PCT/JP2019/037242 filed Sep. 24, 2019.

TECHNICAL FIELD

The present invention relates to a camera and a method for controlling a camera.

BACKGROUND ART

Recently, application of surveillance camera systems to remote surveillance in which image data being captured is transmitted via a network or a coaxial cable and monitored or reproduced as video on a PC viewer at a remote location is increasing.

USB (Universal Serial Bus) 3.0, GigE, Camera link, or a CoaxPress cable is used widely for transmission between a camera and a PC, according to which a high-definition image can be transmitted. For example, according to a CXP camera equipped with a CoaxPress interface, the link rate per cable is 6.25 Gbps, so that by connecting a maximum of four cables, the link rate of output IF can be increased to a maximum transfer rate of 25 Gbps. Further, multiple types of link rates from CXP-1 (1.25 Gbps) to CXP-6 (6.25 Gbps) are defined according to CoaxPress interface standards, and the user can select the number of cables to be connected in accordance with the environment.

If the output link rate is higher than a readout rate in which a sensor reads out imaging data, the captured image can be sent from the camera to a transmission path without lowering a frame rate from the camera side. However, in the industrial field, there are demands to use an ROI (Region of Interest) function of the sensor to limit an effective image area so as to significantly raise the readout rate of the sensor, as described in Patent Document 1, and depending on the system being used, the IF link rate of the camera becomes a bottleneck that prevents the frame rate from being raised.

Figure 2:
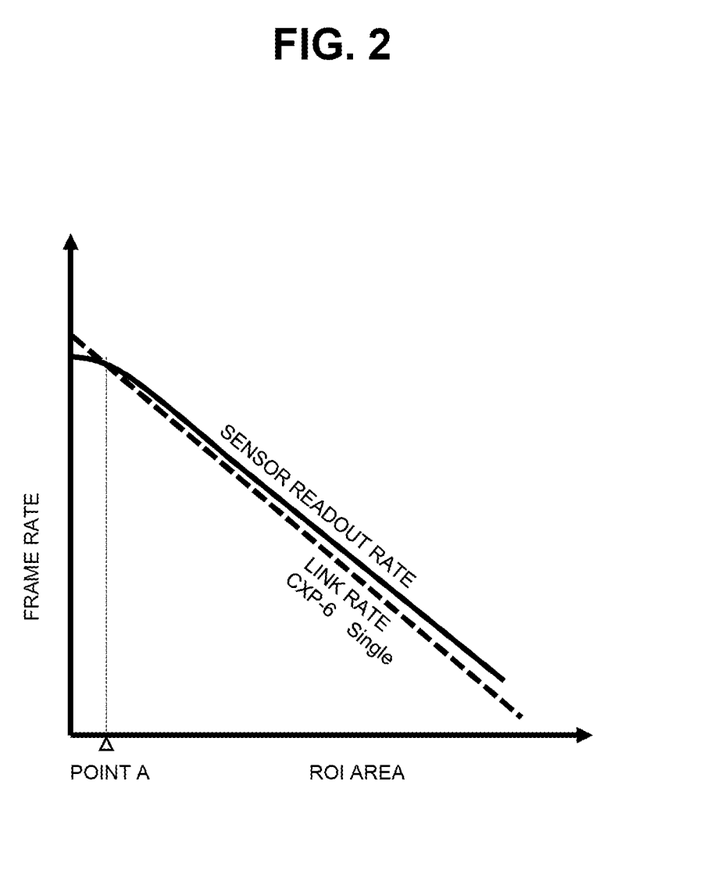
FIG. 2 is a diagram illustrating a relationship between a sensor readout rate and a link rate in an ROI readout.

FIG. 2 is a diagram illustrating a relationship between the readout rate of a general sensor having the ROI function and the link rate of a CoaxPress interface. A horizontal axis represents a size of a setting area of the ROI and a vertical axis represents a frame rate, wherein a solid line indicates a readout rate of a sensor and a broken line indicates the link rate of a single CoaxPress cable. According to both rates, when the ROI setting area is expanded, the frame rate is lowered since the data volume is increased. However, if the area set as the ROI is extremely narrow, the output IF link rate will be higher than the sensor readout rate, and it is known that if the ROI area being set exceeds a certain range, there exists a point A where the sensor readout rate and the output IF rate are inverted, such that the sensor readout rate becomes higher than the output IF link rate.

Figure 3:
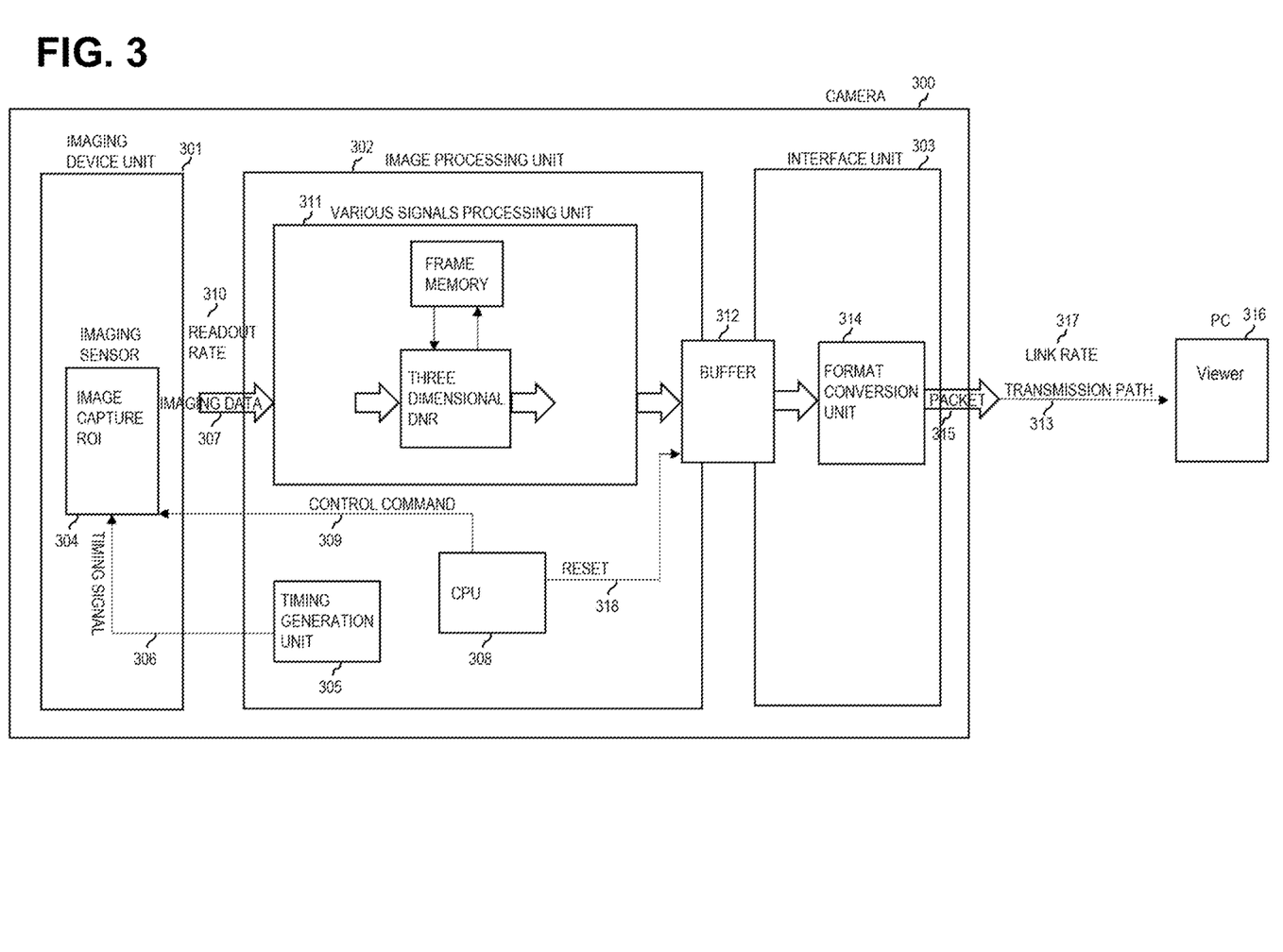
FIG. 3 is a diagram illustrating a configuration of a conventional camera.

Further, FIG. 3 explicitly illustrates the sensor readout rate and the output IF link rate mentioned earlier on a diagram illustrating an internal configuration of a conventional camera 300. The conventional camera 300 is mainly composed of an imaging device unit 301 that performs capturing of image, an image processing unit 302 that performs a predetermined signal processing on the acquired imaging data, and an interface unit 303 that performs conversion of format to an interface suitable for transmission. An imaging sensor 304 that constitutes the imaging device unit 301 performs imaging according to a timing signal 306 supplied from a timing generation unit 305 and transmits an imaging data 307 to the image processing unit 302 at a subsequent stage. A readout rate 310 of the sensor 304 is determined according to a shutter speed (exposure time) acquired from a CPU 308 and a control command 309 for setting the ROI mode.

After subjecting the transmitted imaging data 307 to various image processing such as three-dimensional DNR (Digital Noise Reduction) and gamma correction at a various signals processing unit 311, the image processing unit 302 transmits the data via a buffer 312 to the interface unit 303 at a subsequent stage. In the interface unit 303, data is read from the buffer 312 in accordance with a link rate of a transmission path 313, and a packet 315 having been converted to a predetermined format at a format conversion unit 314 is sent to the transmission path 313. The transmitted packet 315 passes through the transmission path 313 and is reproduced at a reception-side PC 316.

The buffer 312 arranged between the image processing unit 302 and the interface unit 303 is provided to isolate the sensor readout rate 310 of the imaging device unit 301 from an output link rate 317 of the interface unit 303, and it is effective when the sensor readout rate 310 is faster than the output link rate 317.

According to the relationship between the sensor readout rate 310 and the output link rate 317, in a state where the sensor readout rate 310 exceeds the output link rate 317, excessive input is entered to the above-mentioned buffer 312, causing a state of overflow. Once overflow occurs, the buffer 312 reads all the data in the buffer, and any new capture will not be performed until a reset is newly performed, during which time the data read from the buffer is displayed as image on the PC viewer, and at a point of time when a new capture is performed, a temporally discontinuous image will be displayed. Meanwhile, if the sensor readout rate 310 falls below the link rate 317, the buffer will temporarily be empty, but the capturing performed at the input side is carried out continuously, so that missing of frames will not occur and data is read from the buffer immediately after input, by which a maximum throughput is achieved with minimum delay.

CITATION LIST

Patent Literature

[Patent Document 1] Japanese Patent Application Laid-Open Publication No. 2008-42838

SUMMARY OF INVENTION

Problems to be Solved by the Invention

As described above, by utilizing the ROI function of the imaging sensor 304, the readout rate of the sensor can be enhanced significantly, while in a state where a sufficient link rate 317 cannot be ensured at the transmission path 313 side, the frame rate is lowered. The present invention performs a processing to improve an image quality of the camera under such condition.

Means of Solving the Problems

In order to solve the problems mentioned above, one representative aspect of a method for controlling a camera according to the present invention includes a status prediction step of predicting a status of the buffer based on a readout rate of the imaging sensor and a link rate of the transmission path and generating a status prediction information; and an adjustment step of adjusting a content of the image processing according to the status prediction information.

Effects of Invention

According to the present invention, the image quality of output image of the camera can be improved.

Problems, configurations and effects other than those described above will become apparent in the following description of embodiments.

DESCRIPTION OF EMBODIMENT(S)

Hereinafter, one embodiment of the present invention will be described with reference to the drawings. It should be noted that the present embodiment is not intended to limit the scope of the present invention. In the drawings, similar portions are denoted with the same reference numerals.

Figure 1:
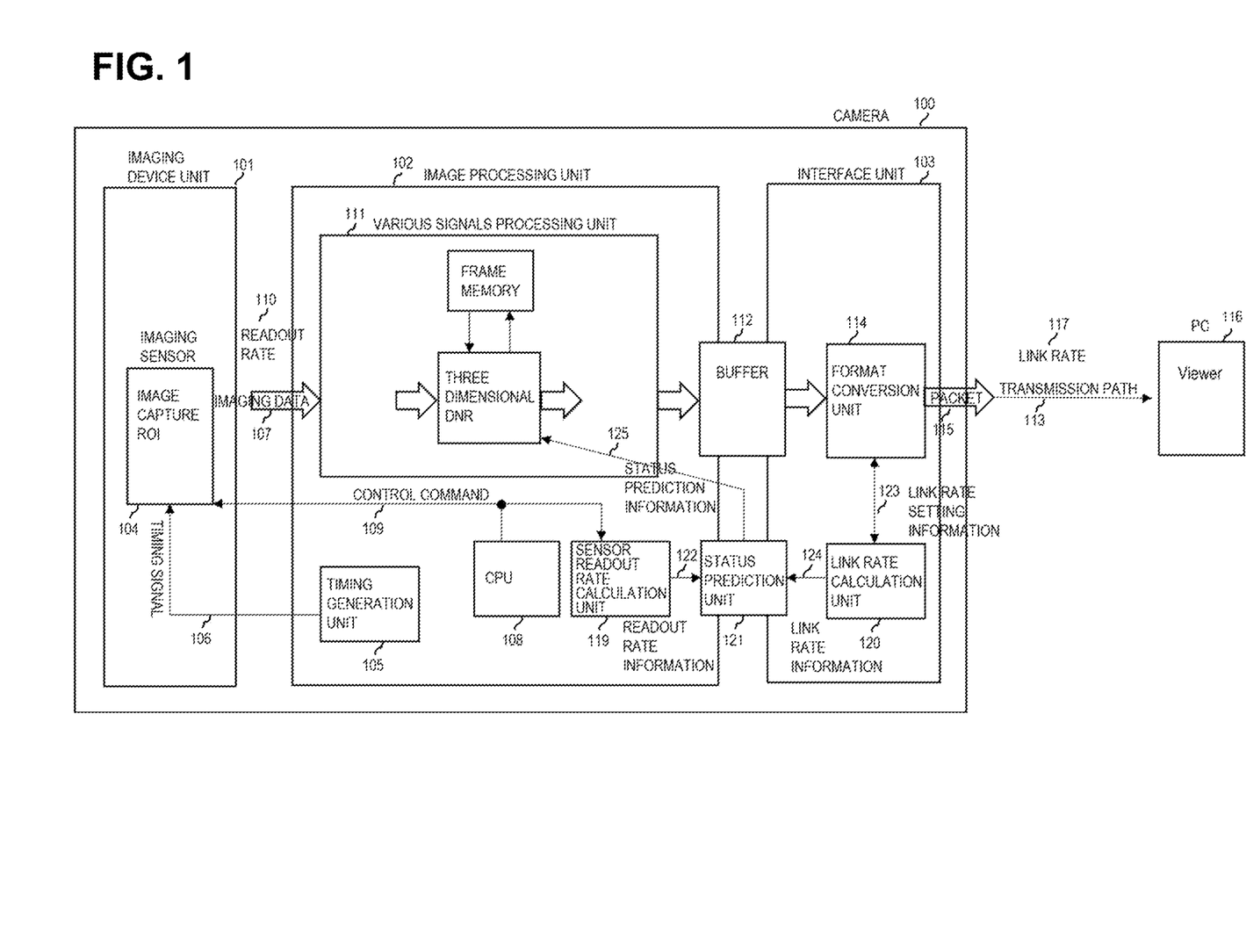
FIG. 1 is a diagram illustrating a configuration of a camera according to one embodiment of the present invention.

FIG. 1 illustrates a camera 100 according to one embodiment of the present invention. The difference from the conventional camera 300 illustrated in FIG. 3 is that the camera 100 includes a sensor readout rate calculation unit 119 that calculates a sensor readout rate, a link rate calculation unit 120 for perceiving a link rate in operation, and a status prediction unit 121 that performs prediction of status of the buffer.

Similar to the conventional camera 300, the camera 100 according to one embodiment of the present invention is also composed of an imaging device unit 101 that performs capturing of image, an image processing unit 102 that performs a predetermined signal processing on the acquired imaging data, and an interface unit 103 that performs conversion of format to an interface suitable for transmission. An imaging sensor 104 that constitutes the imaging device unit 101 performs imaging according to a timing signal 106 supplied from a timing generation unit 105 and transmits imaging data 107 to the image processing unit 102 at a subsequent stage. A sensor readout rate of the sensor 104 is determined according to a shutter speed (exposure time) acquired from a CPU 108 and a control command 109 for setting the ROI mode.

After subjecting the input imaging data 107 to various image processing such as three-dimensional DNR and gamma correction at a various signals processing unit 111, the image processing unit 102 transmits the data via a buffer 112 to the interface unit 103 at a subsequent stage. In the interface unit 103, data is read from the buffer 112 in accordance with a link rate of a transmission path 113 side, and a packet 115 having been converted to a predetermined format at a format conversion unit 114 is sent to the transmission path 113. The above-described configuration is the same as the conventional camera 300.

Meanwhile, in the camera 100 according to one embodiment of the present invention, the CPU 108 calculates a current sensor readout rate based on the shutter speed (exposure time) included in the control command 109 described earlier being sent to the imaging sensor 104 and a setting information of an ROI mode at the sensor readout rate calculation unit 119, and sends a readout rate information 122 being calculated to the status prediction unit 121. Further, the number of cables connected to the transmission path 113 is detected hardware-wise, a link rate setting information 123 of each cable is acquired from the format conversion unit 114, and a link rate calculation unit 120 that performs calculation of the link rate is newly provided. A link rate information 124 being calculated is transmitted to the status prediction unit 121.

The status prediction unit 121 determines the relationship between a sensor readout rate 110 and a link rate 117 at a suitable time based on various rate information acquired from the sensor readout rate calculation unit 119 and the link rate calculation unit 120. If the current link rate 117 differs from the sensor readout rate 110 such that the sensor readout rate 110 is faster than the link rate 117, and the status of the buffer 112 is predicted to change to the overflow side, a status prediction information 125 stating the same is generated. In that case, the status prediction information 125 can include a difference between input and output rates of the buffer 112.

The embodiment of the present invention differs from the conventional camera in that the processing time of the three-dimensional DNR performed at the various signals processing unit 111 is elongated and the input rate of the buffer 112 is lowered so as not to cause overflow.

Figure 4:
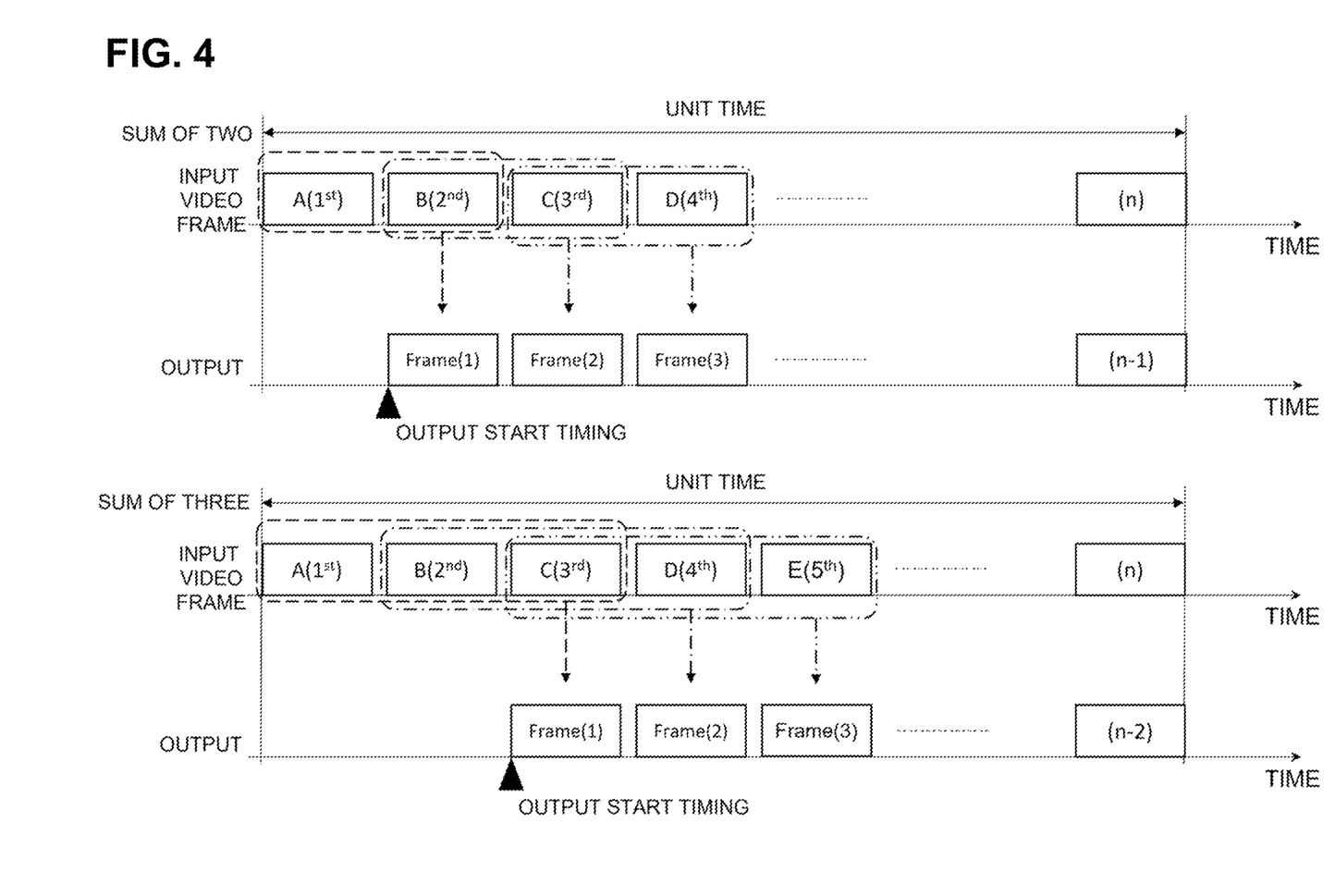
FIG. 4 is a diagram illustrating a three-dimensional DNR processing.

Now, a general three-dimensional digital noise reduction (DNR) processing will be described with reference to FIG. 4. A three-dimensional DNR processing is a processing that uses a frame memory to multiply respective pixel values constituting a plurality of input video frames by a coefficient corresponding to each frame and obtain a total sum of a pixel at a corresponding position of each frame, thereby reducing noise components. FIG. 4 illustrates a case where a coefficient is multiplied to each of the respective pixel values constituting two input video frames to obtain a total sum, and a case where a coefficient is multiplied to each of the respective pixel values constituting three input video frames to obtain a total sum.

If greater number of frames are referenced retrospectively, more noise will be integrated in the time direction, so that improvement of SN (Signal to Noise) of one output video can be expected, but on the other hand, the processing time for the first input frame at the top to be processed and output is elongated, so that a delay occurs with respect to the actual video. Further, residual image may stand out in an input video with intense motion. Therefore, conventionally, processing was often adopted where the number of input video frames used to obtain one output is fixed, by taking into consideration the intensity of motion of the input video and the like.

The present embodiment focuses on the number of input video frames used to obtain one output, which had conventionally been fixed. The status prediction information 125 generated at the status prediction unit 121 of FIG. 1 is transmitted to a three-dimensional DNR block in the various signals processing unit 111. In a state where the status prediction information 125 predicts that the status of the buffer 112 is going to change to the overflow side, the three-dimensional DNR block increases the number of input video frames used to obtain one output. In this state, the difference between input and output rates of the buffer 112 included in the status prediction information can be utilized. If it is predicted that the status is going to change to the underflow side, the number of input video frames used to obtain one output is reduced to as low as a minimum number capable of obtaining the desired S/N. The operation of the three-dimensional DNR block is reset every predetermined unit time, and the input rate of the buffer 112 is adjusted by increasing or decreasing the delay of output start timing generated every time. As the input rate of the buffer 112 lowers, more noise is integrated in the time direction and the S/N is improved, so that the image quality is expected to improve.

For example, as illustrated in FIG. 4, in a case where two past input video frames are referenced and each frame is multiplied by a weighted coefficient to process the initial frame, the initial delay before output will be a two-frame time from the actual video, but thereafter, processed frames will be output continuously. Similarly, in a case where three past input video frames are referenced and each frame is multiplied by a coefficient to obtain the total sum, the required initial delay is elongated by one frame time to be extended to a three-frame time, but thereafter, processed frames will be output continuously.

That is, by linking the number of past frames being referenced with the state of the buffer 112 and performing suitable switching control, the number of frames being output can be increased or decreased and the input rate of the buffer 112 can be adjusted, so that the image quality is expected to improve as the number of past frames being referenced is increased to lower the input rate of the buffer 112.

Figure 5:
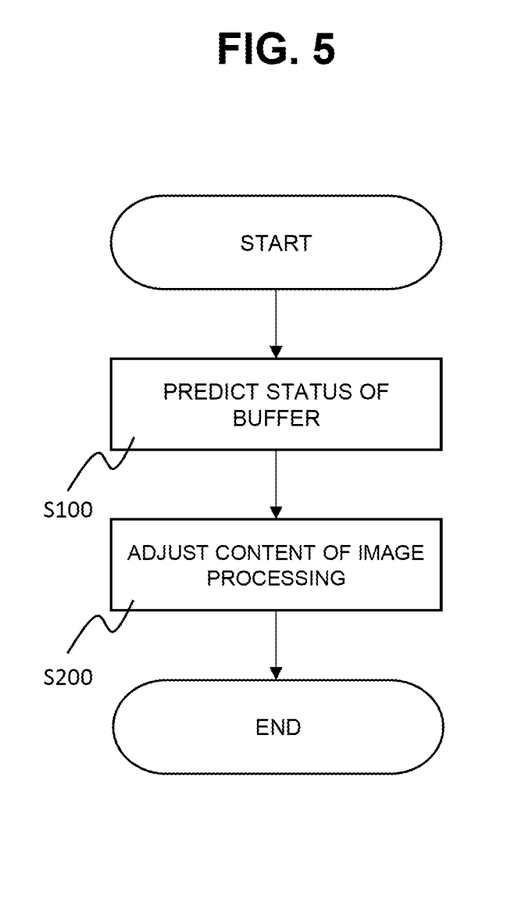
FIG. 5 is a diagram illustrating a flow of a method for controlling a camera according to one embodiment of the present invention.

FIG. 5 illustrates a flow of a method for controlling a camera according to one embodiment of the present invention. The method for controlling a camera according to one embodiment of the present invention includes a status prediction step S100 of predicting a status of the buffer based on the readout rate of the imaging sensor and the link rate of the transmission path and generating a status prediction information, and an adjustment step S200 of adjusting contents of the image processing according to the status prediction information.

The embodiment of the present invention has been described above, but the present invention is not limited to the embodiment described above, and various modifications are enabled within the scope of the present invention.

DESCRIPTION OF THE REFERENCE NUMERAL

100; 300: Camera, 101; 301: Imaging device unit, 102; 302: Image processing unit, 103; 303: Interface unit, 104; 304: Imaging sensor, 105; 305: Timing generation unit, 106; 306: Timing signal, 107; 307: Imaging data, 108; 308: CPU, 109; 309: Control command, 110; 310: Sensor readout rate, 111; 311: Various signals processing unit, 112; 312: Buffer, 113; 313: Transmission path, 114; 314: Format conversion unit, 115; 315: Packet, 116; 316: Reception-side PC, 117; 317: Link rate, 318: Reset, 119: Sensor readout rate calculation unit, 120: Link rate calculation unit, 121: Status prediction unit, 122: Readout rate information, 123: Link rate setting information, 124: Link rate information, 125: Status prediction information, S100: Status prediction step, S200: Adjustment step.

The invention claimed is:

1. A method for controlling a camera comprising:
an imaging sensor configured to acquire an imaging data;
a signal processing unit configured to perform an image processing on the imaging data;
a buffer into which data subjected to the image processing is written; and
a format conversion unit configured to convert a format of data read from the buffer and transmit the data to a transmission path,
wherein the method comprises:
a status prediction step of predicting a status of the buffer based on a readout rate of the imaging sensor and a link rate of the transmission path and generating a status prediction information; and
an adjustment step of adjusting a content of the image processing according to the status prediction information.

2. The method according to claim 1, wherein, in a state where the status prediction information predicts change of status of the buffer to an overflow side, the adjustment step elongates a time required for the image processing and also lowers an input rate of the buffer.

3. The method according to claim 1, wherein the image processing is a three-dimensional digital noise reduction.

4. The method according to claim 3,
wherein the three-dimensional digital noise reduction is configured to multiply respective pixel values constituting a plurality of input video frames by a coefficient corresponding to each frame, obtain a total sum for a pixel at a corresponding position of each frame, and reduce noise components, and
the adjustment step is configured to increase or decrease a number of input video frames used to obtain one output and also adjust an input rate of the buffer.

5. The method according to claim 2, wherein the image processing is a three-dimensional digital noise reduction.

6. The method according to claim 5,
wherein the three-dimensional digital noise reduction is configured to multiply respective pixel values constituting a plurality of input video frames by a coefficient corresponding to each frame, obtain a total sum for a pixel at a corresponding position of each frame, and reduce noise components, and
the adjustment step is configured to increase or decrease a number of input video frames used to obtain one output and also adjust an input rate of the buffer.

7. A camera comprising:
an imaging sensor configured to acquire an imaging data;
a signal processing unit configured to perform an image processing on the imaging data;
a buffer into which data subjected to the image processing is written;
a format conversion unit configured to convert a format of data read from the buffer and transmit the data to a transmission path; and
a status prediction unit of predicting a status of the buffer based on a readout rate of the imaging sensor and a link rate of the transmission path and generating a status prediction information,
wherein the signal processing unit is configured to adjust a content of the image processing according to the status prediction information.

8. The camera according to claim 7, wherein, in a state where the status prediction information predicts change of status of the buffer to an overflow side, a time required for the image processing is elongated and an input rate of the buffer is lowered.

9. The camera according to claim 7, wherein the image processing is a three-dimensional digital noise reduction.

10. The camera according to claim 8, wherein the image processing is a three-dimensional digital noise reduction.

11. The camera according to claim 9,
wherein the three-dimensional digital noise reduction is configured to multiply respective pixel values constituting a plurality of input video frames by a coefficient according to each frame, obtain a total sum for a pixel at a corresponding position of each frame, and reduce noise components, and
the signal processing unit is configured to increase or decrease a number of input video frames used to obtain one output and also adjust an input rate of the buffer.

12. The camera according to claim 10,
wherein the three-dimensional digital noise reduction is configured to multiply respective pixel values constituting a plurality of input video frames by a coefficient according to each frame, obtain a total sum for a pixel at a corresponding position of each frame, and reduce noise components, and
the signal processing unit is configured to increase or decrease a number of input video frames used to obtain one output and also adjust an input rate of the buffer.

\* \* \* \* \*